US006986458B2

(12) United States Patent
Flügge et al.

(10) Patent No.: US 6,986,458 B2
(45) Date of Patent: Jan. 17, 2006

(54) METHODS AND SYSTEMS FOR USER MEDIA INTEROPERABILITY

(75) Inventors: Wolfgang Flügge, Nordrhein-Westfalen (DE); Heiner Eichhoff, Moenchengladbach Nordrhein-Westfalen (DE)

(73) Assignee: Scheidt & Bachmann GmbH, Mönchengladbach (DE)

( * ) Notice: Subject to any disclaimer, the term of this patent is extended or adjusted under 35 U.S.C. 154(b) by 0 days.

(21) Appl. No.: 10/732,412

(22) Filed: Dec. 11, 2003

(65) Prior Publication Data

US 2004/0140351 A1   Jul. 22, 2004

Related U.S. Application Data

(60) Provisional application No. 60/439,444, filed on Jan. 13, 2003, provisional application No. 60/432,235, filed on Dec. 11, 2002.

(51) Int. Cl.
*G06F 17/00* (2006.01)

(52) U.S. Cl. ..................................... 235/375; 713/172

(58) Field of Classification Search ................ 235/375, 235/382, 492; 702/189; 713/172; 380/25
See application file for complete search history.

(56) References Cited

U.S. PATENT DOCUMENTS

| | | | |
|---|---|---|---|
| 4,877,179 A | 10/1989 | Baker et al. | 232/7 |
| 5,191,195 A | 3/1993 | Aubrey | 235/384 |
| 5,298,726 A | 3/1994 | Aubrey | 232/384 |
| 5,574,441 A | 11/1996 | Roes et al. | 340/870.31 |
| 5,612,684 A | 3/1997 | Kelly et al. | 340/870.31 |
| 5,619,932 A | 4/1997 | Efland et al. | 109/24.1 |
| 6,005,942 A * | 12/1999 | Chan et al. | 713/187 |
| 6,010,074 A | 1/2000 | Kelly et al. | 235/492 |
| 6,097,292 A | 8/2000 | Kelly et al. | 345/605 |
| 6,216,227 B1 * | 4/2001 | Goldstein et al. | 713/172 |
| 6,259,769 B1 | 7/2001 | Page et al. | 375/58 |
| 6,296,191 B1 * | 10/2001 | Hamann et al. | 235/492 |
| 6,304,223 B1 | 10/2001 | Hilton et al. | 343/702 |
| 6,339,765 B1 * | 1/2002 | Maher | 705/41 |

(Continued)

FOREIGN PATENT DOCUMENTS

GB   2 287 565   9/1995

(Continued)

OTHER PUBLICATIONS

Definitions of package java.long and class java.lang.String posted on website http://java.sun.com and copyright 1993-2001.*

*Primary Examiner*—Thien M. Le
*Assistant Examiner*—Daniel A. Hess
(74) *Attorney, Agent, or Firm*—Winston & Strawn LLP

(57) ABSTRACT

Systems and methods are provided for multi-application user media such as smart cards that can be used by users to obtain related benefits. Multiple applications of one type such as transportation may be implemented on user media from a standard or reference of that application type. Hierarchical networks and data structures may be provided in implementing user media. User media may include application identifiers, associated data groups, and data structures that are associated with the data groups. An application may be configured by different originators differently based on sets of defined data groups and/or data structures from which the originator may select in implementing the application. Multiple applications of different types such as financial, health, transportation, etc. may be configured on user media to provide related services.

30 Claims, 10 Drawing Sheets

U.S. PATENT DOCUMENTS

| | | | |
|---|---|---|---|
| 6,349,517 B1 | 2/2002 | Manley et al. | 52/239 |
| 6,364,208 B1 | 4/2002 | Stanford et al. | 235/492 |
| 6,375,084 B1 | 4/2002 | Stanford et al. | 235/492 |
| 6,394,346 B1 | 5/2002 | Bonneau, Jr. et al. | 235/438 |
| 6,418,420 B1 * | 7/2002 | DiGiorgio et al. | 705/40 |
| 6,480,101 B1 | 11/2002 | Kelly et al. | 340/10.2 |
| 6,510,998 B1 | 1/2003 | Stanford et al. | 235/492 |
| 6,547,148 B2 | 4/2003 | Kelly et al. | 235/492 |
| 6,547,150 B1 * | 4/2003 | Deo et al. | 235/492 |
| 6,577,229 B1 | 6/2003 | Bonneau et al. | 340/10.41 |
| 6,591,229 B1 * | 7/2003 | Pattinson et al. | 702/189 |
| 6,595,416 B1 | 7/2003 | Newsome et al. | 235/381 |
| 6,655,587 B2 | 12/2003 | Andrews et al. | 232/383 |
| 6,659,345 B2 * | 12/2003 | Sukeda et al. | 235/382 |
| 2002/0000473 A1 | 1/2002 | Kelly et al. | 235/492 |
| 2002/0161729 A1 | 10/2002 | Andrews | 705/417 |
| 2002/0174071 A1 * | 11/2002 | Boudou et al. | 705/41 |
| 2003/0019927 A1 | 1/2003 | Lindgren | 235/382 |
| 2003/0137404 A1 | 7/2003 | Bonneau, Jr. et al. | 340/10.41 |
| 2003/0154375 A1 * | 8/2003 | Yang | 713/172 |
| 2004/0088562 A1 * | 5/2004 | Vassilev et al. | 713/200 |
| 2004/0122774 A1 * | 6/2004 | Studd et al. | 705/65 |
| 2004/0252868 A1 * | 12/2004 | Nilsson | 382/124 |

FOREIGN PATENT DOCUMENTS

| | | |
|---|---|---|
| WO | WO 93/09516 | 5/1993 |
| WO | WO 95/26014 | 1/1995 |

* cited by examiner

METHODS AND SYSTEMS FOR USER MEDIA INTEROPERABILITY

CROSS-REFERENCE TO RELATED PATENT APPLICATIONS

This application claims the benefit of U.S. Provisional Patent Application No. 60/432,235, filed Dec. 11, 2002, and U.S. Provisional Patent Application No. 60/439,444, filed Jan. 13, 2003, which are incorporated herein by reference in their entirety.

FIELD OF THE INVENTION

The present invention is related to interoperability of user media with different service providers, and more particularly to smart card interoperability.

BACKGROUND ART

There is presently an increasing trend towards the use of smart cards for personal services. Smart cards are convenient and portable for automatically obtaining services from a variety of different vendors. The increased demand may result in the accumulation of a large number of smart cards that are issued by different service providers for their corresponding services. The accumulation of smart cards for each user may present a significant inconvenience to the users of smart cards. Implementing smart cards with multiple functions can be faced with obstacles that include the limited memory on-board smart cards, variations in the physical memory of different card types, requirements for high transfer rates that may be hindered by increased complexity due to the implementation of multiple functions, and quickly increasing requirements for interoperability as applications providers are added to the multi-functional environment. Other limitations may also be faced.

Known techniques in this field apply rigid fixed formatting techniques in which each application of the same type must accommodate data fields needed for the other applications of the same type. Such techniques tend to occupy a substantial portion of the memory on a smart card and can be deficient in allowing for limited expansion or reconfiguration of existing applications.

As such, there is a need for improved techniques for user media and related applications that provide interoperability in multi-functional environments.

SUMMARY OF THE INVENTION

In accordance with the principles of the present invention, techniques are provided for flexible implementation and operation of multiple functions for use with user media such as smart cards in order to receive the benefit of associated services. A system, which may comprise a network of equipment (e.g., media readers), may be established for example by different entities. Multiple functions may be available on the system based on established configuration of user media in cooperation with software and/or hardware on the system. The system may be specific to a particular region for example to provide regional transportation services. A system may be implemented in which user media such as smart cards include data having a top-level that is organized based on categories or types of applications (e.g., transportation, parking, banking, etc.). In some instances, if desired, multiple instances of the same category or type may exist at the top-level, however, it is more efficient for a single category or type to exist so that a functional hierarchy is established. Different originators in the same category or type may configure their software to use data configured below the top-level category or type and may take advantage of common data groups, data structures, or data elements that may exist because of potential overlap in the service or function that they provide to users. Thus, for example, a smart card may contain transportation at a top-level with one or more lower levels being configured for transportation software of different transportation operators (e.g., operators in a region). At a lower level, multiple software, which is sometimes referred to herein as applications, of different originators may be implemented. User media (e.g., a smart card) may include an application when the media includes structured data (e.g., data groups, data structures, data elements, etc.) that are configured for operation with a particular executable code (e.g., executable code residing on card reader equipment). Executable code may also be included on user media in combination with the data to enable an application on a smart card. Thus an application (e.g., a subway transportation application) may reside on a smart card even in the absence of executable code on the smart card.

A profile may be established for an application, which may then be used to configure user media to operatively perform with the application to accomplish desired transactions and updates to stored information. A reference or standard may be the source for the profile with which different organizations can develop services or applications for use on the cards. For example, a list of data groups, related functions, data structures, and related information such as data elements may be established for applications that are to provide services in a particular field of service or industry because of the potential commonality in function or data. Multiple functions may be configured for use on the same card based on a standard list or reference while preferably also providing the capability to cross-reference known data between implemented applications.

The cards of each issuer or originator may be structured to include data groups and data elements that have been selected by the issuer or originator to the exclusion of other data groups and data elements that are also available for their application from a standard list or reference specification. Each application on user media (e.g. a smart card) may have an associated application identifier on the user media. An application directory may be included on the user media to assist applications to locate and/or identify data or software associated with the applications on user media. Each application or application directory may have a plurality of data groups associated with it. A data group directory may be provided on the user media for the data groups associated with an application. Each data group may include data elements that are structured together in a data structure for access by its associated application. The data group and data structure may be directly related to the functions of the application. Data groups and data structures may have been a selected subset of a list of data groups and data structures that have been defined for use with that application or applications of that type. This allows different application developers for the same type of application to implement their application differently by using a "pick and choose" technique to decide which common data groups or data structures shall be configured for their application on issued cards.

Within a network of supporting equipment, software and hardware (e.g., card readers) of different organizations may be configured to operatively interact with the multi-application cards to provide services to users. Information on user media may be stored and updated at different levels of the system. Information may move from a central computer system (e.g., a region computer system coordinating activities within a region) down to individual user media to write information on the media. In addition, systems and techniques illustratively described herein may be independent of the type of user media.

Data structure may be implemented without for example including tagged length value information because such information may be established within the system. Field information such as bit length, format type, character, numeric value, currency for data elements may be excluded from a data structure such that for example, only an index is included for data elements on a card. Related information regarding format type, bit length, etc. may be obtained by a system from reference information for data elements in a particular standard list when the existence of data elements are identified.

If desired, the user media may be a smart card such as a memory smart card. User media may be configured for a single application consisting of all necessary data for a particular application type, multiple applications of the same type and/or multiple applications of different types. For example, multiple transportation applications may be implemented to provide multi-application media for use in a particular region. If desired, other types of applications may also be implemented such as to provide user media that is structured for credit card applications, public transpiration applications, health care applications, etc. Alternatively, a group of applications (e.g. ticketing, purse) could be incorporated into a single application for use in a particular region thereby allowing improvements in transaction times, and simplifications of processing.

BRIEF DESCRIPTION OF THE DRAWINGS

Further features and advantages of the invention can be ascertained from the following detailed description that is provided in connection with the drawing(s) described below.

DETAILED DESCRIPTION OF THE PREFERRED EMBODIMENTS

Figure 1:
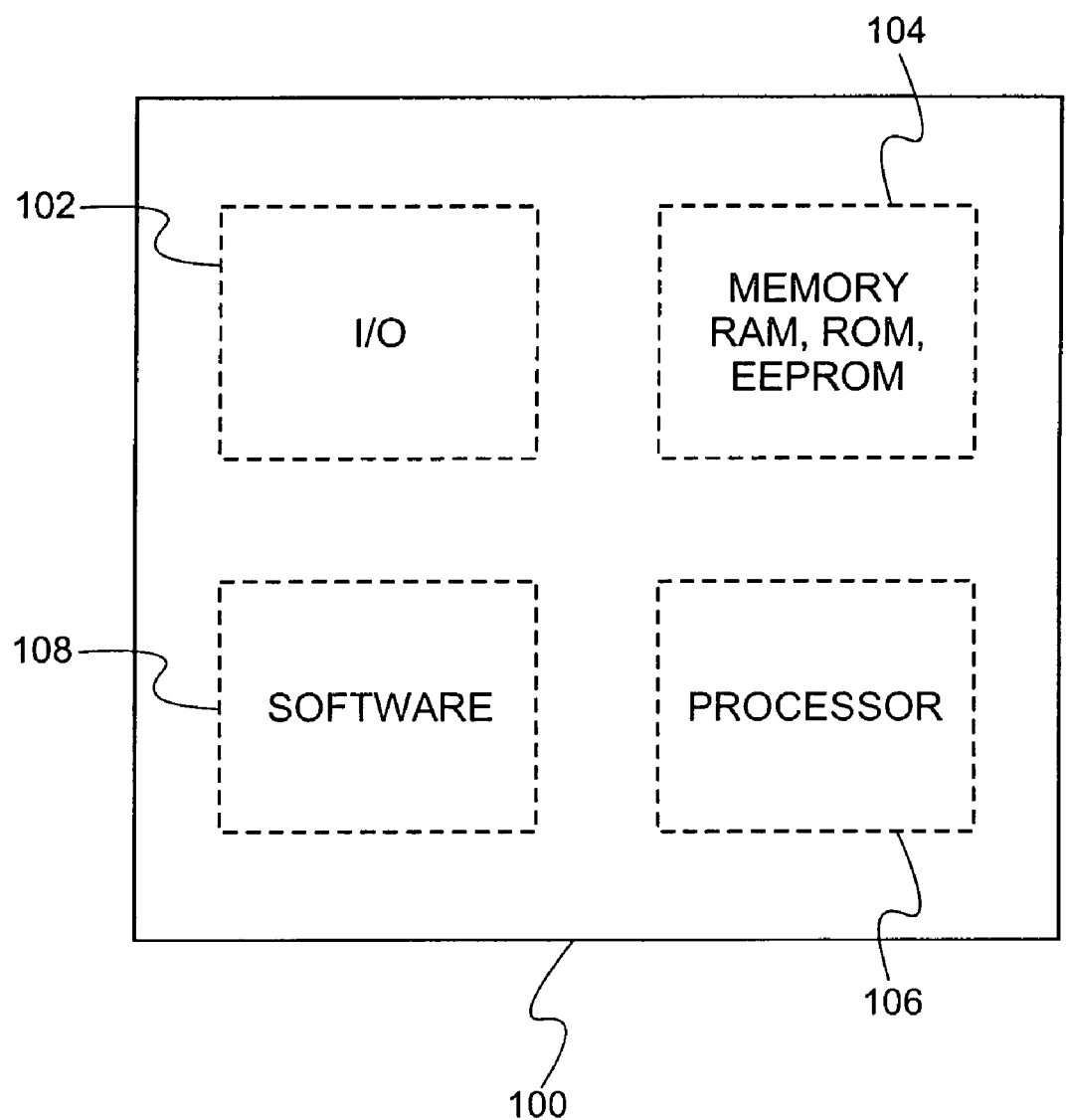
FIG. 1 is a functional block diagram of software and/or hardware in accordance with one embodiment of the present invention.

User media such as a user card (e.g., a smart card) may have various circuitry on-board in the form of integrated circuits and in some cases, executable software, to provide various functionality. For example, with reference now to FIG. 1, card 100 may include input/output interface 102, memory 104, processor 106, and software 108. Card 100 may be the shape and size of generally known smart cards (e.g., the shape and size of a credit card). Various techniques for producing card 100 and on-board hardware are known to those of ordinary skill in the art. Input/output interface 102 may provide for a contact or contact-less interface for communicating with the on-board memory, processor, or software of card 100. In the case of a contact-less interface an optical read/write interface may for example be provided. Processor 106 may be a microprocessor that is configured to interact with memory 104 and software 108 to provide desired functionality. Software 108 may be configured to operate on processor 106 to support a card operating system and one or more card applications. In some embodiments, card 100 may be a memory card, in which case it will not include processor 106 and software 108. Memory 104 may include RAM, ROM, EEPROM, etc. for providing storage of data, data structure, or software. In the case of processor cards, card 100 will typically include RAM, ROM, and EEPROM storage for supporting processor card functionality. In the case of memory cards, card 100 will typically at least include EEPROM storage.

Figure 2:
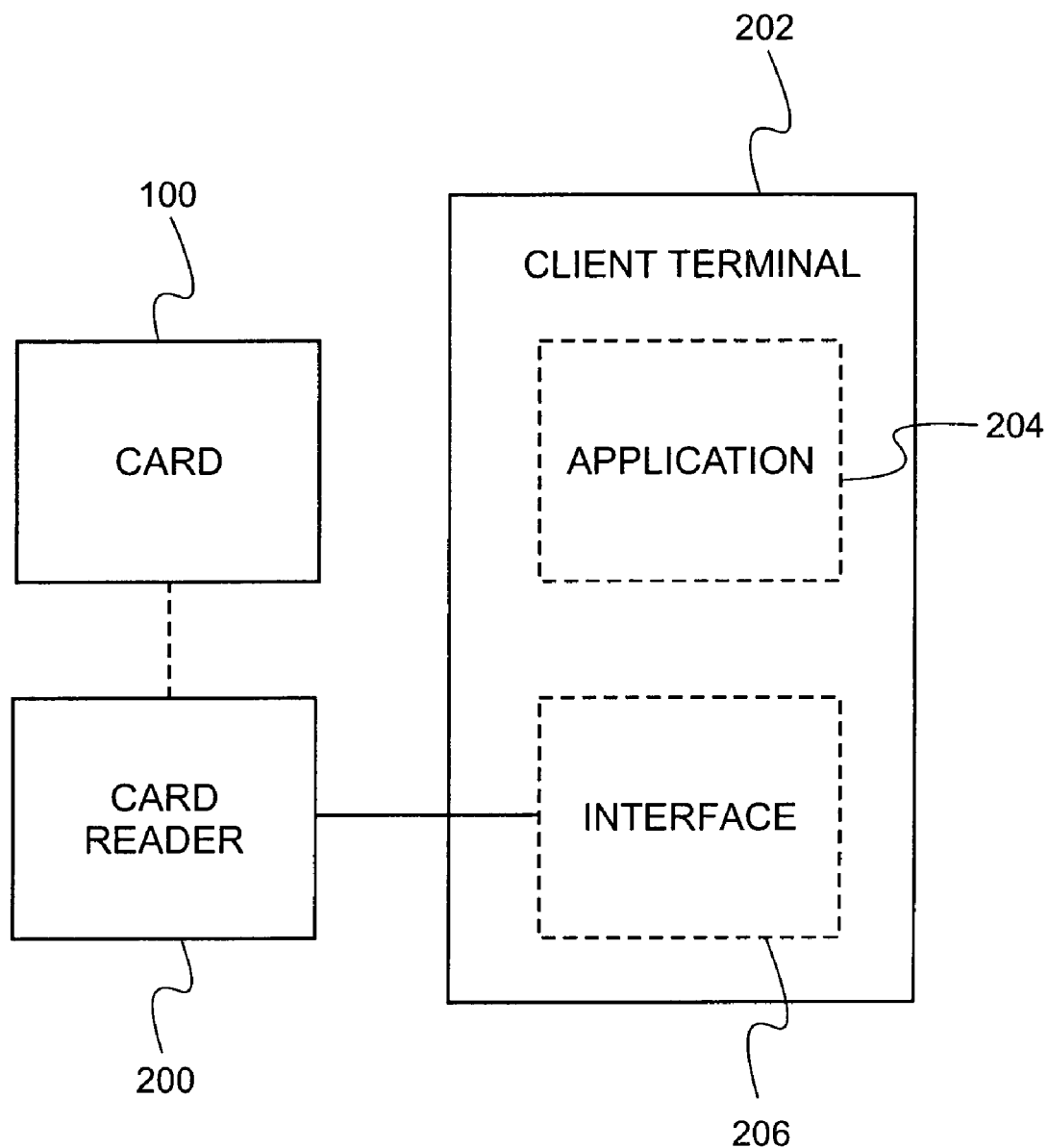
FIG. 2 is a functional block diagram of card reader equipment in accordance with one embodiment of the present invention.

Various benefits can be provided to a cardholder through supporting applications that interact with a user's card at various distributed card reader equipment. For example, with reference now to FIG. 2, card reader equipment may include card reader 200 and client terminal 202. Card reader 200 may be configured to operatively connect with card 100, for example through contact or contact-less connections. Various card readers are presently on the market for reading and/or writing smart cards. Client terminal 202 can be a computer system (e.g., a personal computer) that communicates with card reader 200 to interact with card 100. Client terminal 202 may include one or more applications 204 and other software such as an operating system. Application 204 may be applications that are each configured to provide the benefit of specific services such as transportation, health benefits, electronic wallet, etc. For example, application 204 may be a transportation application for providing various transportation such as ticketing, fare collection, etc. Interface 206 may include driver for interfacing with card reader 200. Interface 206 may also include an application program interface for providing an application interface to application 204 that allows applications 204 to interact with software, memory, or processor on-board card 100. In cases in which card 100 is a processor card, a card operating system may be used to interact with the card to execute specific card services that are available via the card operating system. The card services may for example be called through the application program interface with application 204. In the case of memory cards, interface 206, card reader 200, and application 204 are configured to work together to read and write to memory locations on-board card 100 to allow application 204 to provide desired services. The interaction between card 100 and card reader 200 is typically very short in duration (e.g., hundreds of a second) to allow the cardholder to quickly interact with the system.

Card reader 200 and client terminal 202 may be one of many such equipment that are dispersed geographically and are network connected (e.g., through a central database) to provide services that are associated with each different application 204 (if more than one exists) on client terminals 202 and/or its associated network.

Figure 3:
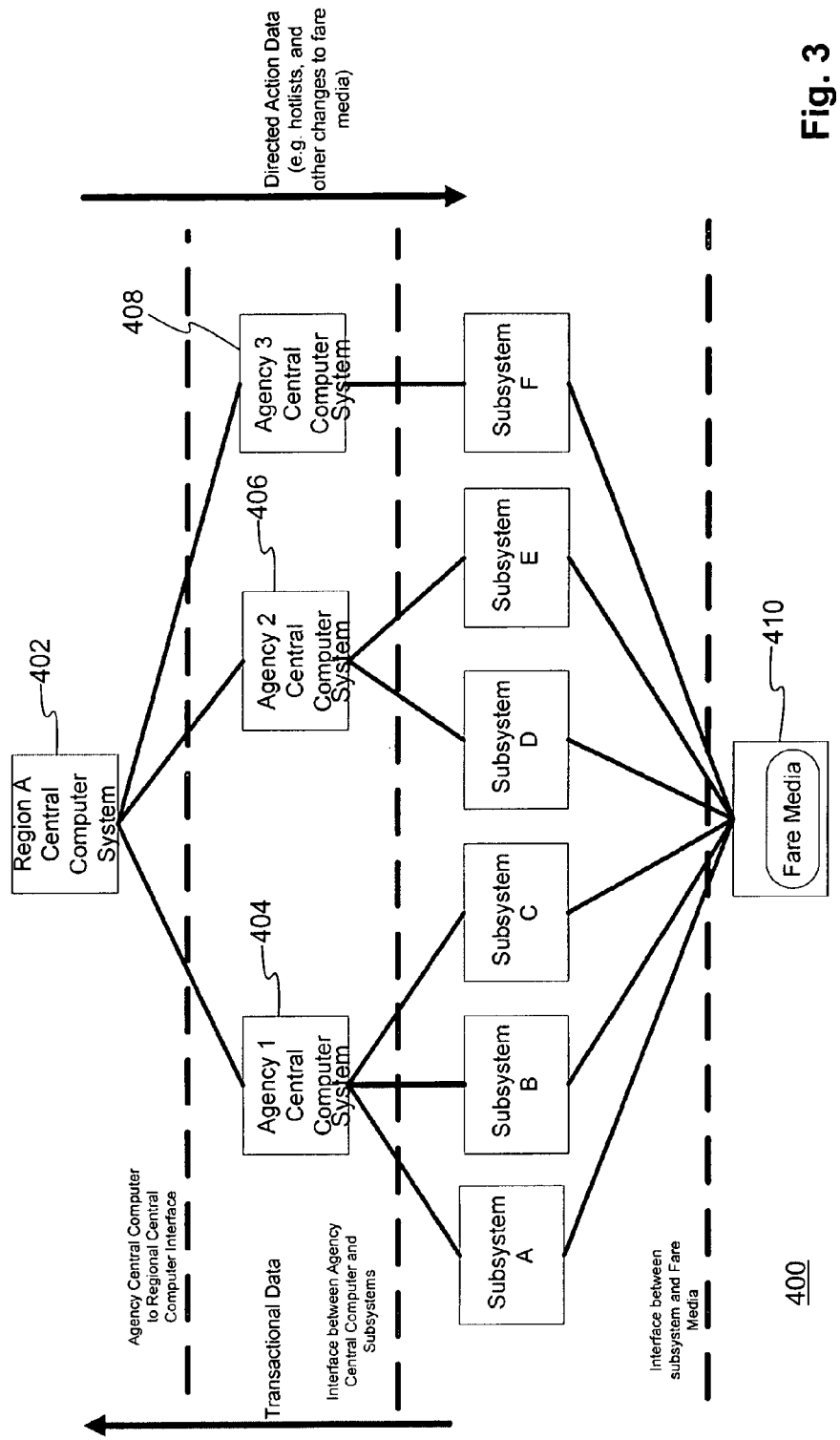
FIG. 3 is a functional block diagram of a regional card system in accordance with one embodiment of the present invention.

FIG. 3 provides an illustrative arrangement for a regional transportation system which may for example incorporate equipment and networks such as that shown in FIG. 4 (discussed below). System 400 may include region central computer system 402, such that there may be multiple region central computer systems for a number of different regions. A region may have agencies (e.g., transportation agencies) that have agency central computer systems, e.g., agency 1 central computer system 404, agency 2 central computer system 406, and agency 3 central computer system 408. Agency central computer systems 404, 406, and 408 may be configured to communicate with region central computer 402 to receive and transmit information so that their fare card information is updated and for example, information about fare card activity is processed and stored. Agency central computer systems may be configured to communicate and operatively interact with related subsystems that interface with user fare media, (e.g., user smart cards, or other media). A subsystem may be equipment such as subway equipment (e.g., fare gates, fare validation equipment, ticket office machine, remote card reader and workstation, etc.), commuter rail equipment (e.g., fare validation equipment, ticket office machine, remote card reader and workstation, etc.), bus/LRV equipment (e.g. fare box, onboard validation equipment, garage computer system, etc.), or other subsystem equipment. Fare media 410 may be a smart card (e.g., memory card or processor card) or other media that can be used with agency subsystems and which carry data fields, structures, size, or segmentation. In operation, various data is passed through the hierarchical levels in between fare media 410 and region central computer system 402 For example, directed action data such as hot lists and changes to fare media may be communicated downward through the hierarchy towards the fare media and transactional data resulting from fare media interaction with subsystems may travel upwards through the hierarchy towards the regional system.

Regional interoperability may be permitted by applying format techniques (e.g., smart card format techniques) that allow for flexibility in implementation. Preferably, the format techniques are independent from the user media technology (e.g., physical card technology) that is applied in each individual case and is designed to adapt to future technological advances and future expansions in function and data that will be handled by the media (e.g., user cards).

In such systems, each agency may have implemented its own transportation application, which may be reflected by the inclusion of data configuration on fare media for their application. The data configuration of each may be configured to be understood by the systems of each agency (404, 406, and 408). The smart cards include data groups, data structures, data elements, and other related data configuration for each transportation application wherein the smart cards include information identifying the data settings based on common data elements, data structure, data groups, etc., which may have been selected from a standard list.

Figure 4:
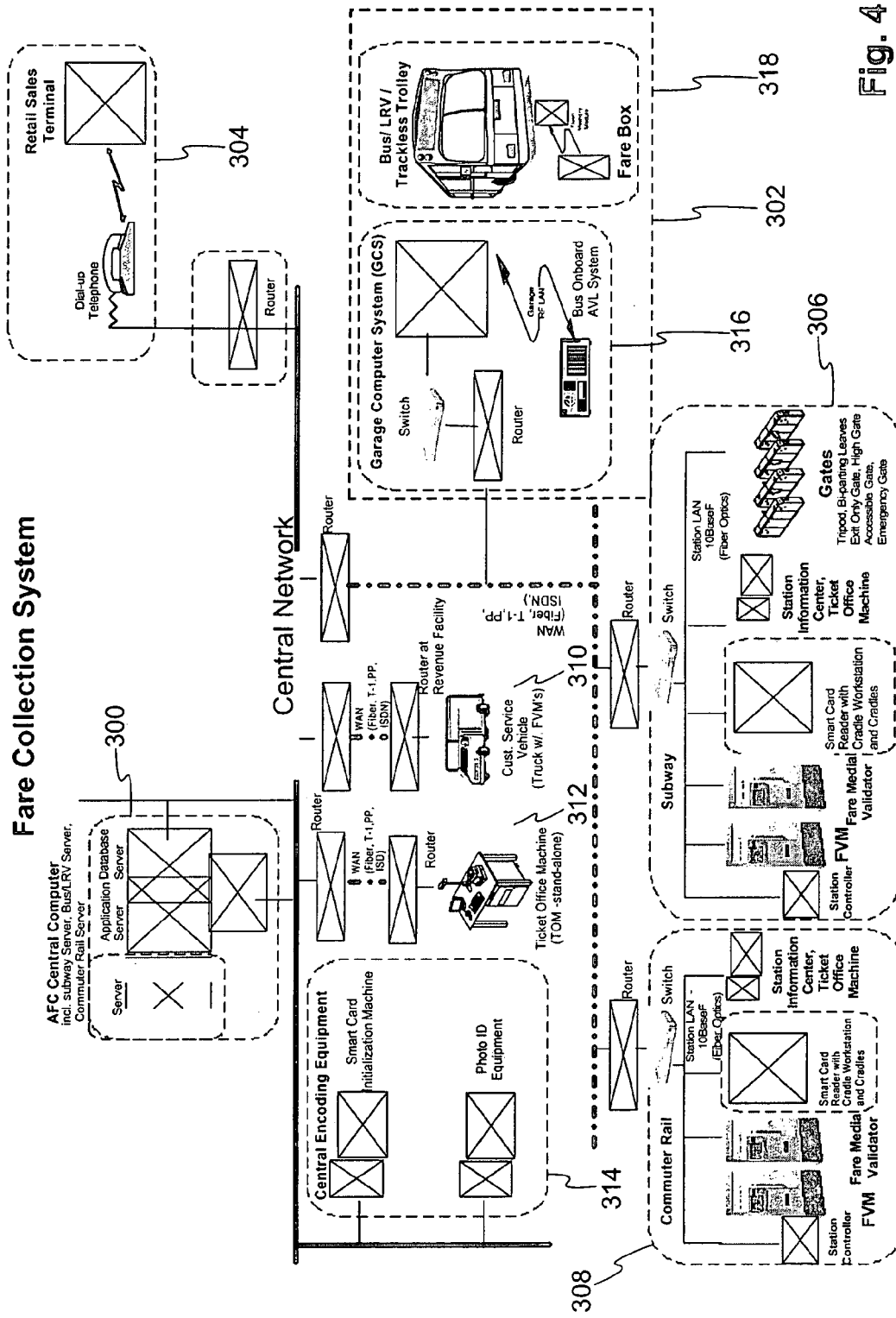
FIG. 4 is a functional block diagram of an agency system in accordance with one embodiment of the present invention.

One example of an agency system specifically for regional public transportation is illustrated in FIG. 4. Transportation services within a particular region may include a wide range of transportation types, transportation providers, ticketing techniques, ticketing validation techniques, and fare collection techniques. The number of vehicles, passengers, and geographic distribution of the passengers, vehicles, and equipment is also accounted for in the regional system. As shown, the system may include central computer 300, which may include one or more servers, for example to provide an application server, a database server, a subway server (for interacting with subway equipment), bus/land roaming vehicles ("LRV") equipment, commuter rail equipment, etc.

The regional transportation system may include bus/LRV equipment 302, retail sales equipment 304, subway equipment 306, commuter rail equipment 308, customer service equipment 310, ticket office equipment 312, and central encoding equipment 314. As shown, various (wired or wireless) communications network techniques such as LAN, WAN, Ethernet TCP/IP, Internet, fiber, T-1, PP, ISDN, switches, or routers, and variation thereof may be configured to establish a network for supporting a transportation application within the system. Central encoding equipment 314 may include a smart card initialization machine and if desired, photo ID equipment. The smart card initialization machine may be configured to initialize individual cards that are issued with appropriate security and transportation data. The photo ID equipment may be configured to receive, store, or generate photo identifications for individual cards.

Ticket office equipment 312 may, for example, be one or more ticket office machines (e.g., a stand-alone ticket office machine) for providing card services. Customer service equipment 310 may for example include one or more trucks that carry fare validation machines for providing card services. Communications with the network such as with central computer 300 may be established when customer service equipment 310 (e.g., trucks) are at a transportation system service facility such as a revenue facility. Retail sales equipment may include a retail sales terminal and communications equipment (e.g., a telephone) for communicating with the network. Bus/LRV equipment 302 may include garage computer system 316 and bus/LRV 318. Garage computer system 316 may include computer equipment that is configured to communicate with the network and communicate with fare validation equipment on-board a bus or LRV (e.g., through an RF connections). Bus/LRV 318 may for example be a bus or other vehicle that has a fare box and a flash memory module for reading and updating user cards. Subway equipment 306 and commuter rail equipment 308 may each include fare validation machines, station controllers, station information centers with ticket office machines and network capability to support remote smart card readers with cradle and workstations (e.g., a user's home computer equipment) to provide transportation card services to users. Gates are also typically included as part of subway equipment 306. Central computer 300 may for example include an application server and a database server that interact with network nodes such as subway equipment 306 or bus/LRV equipment 302 to provide software downloads, application functionality, or a central card information database, which is updated based on network interaction with cards. As such, the system may be configured to permit a user to ride different transportation that may be offered by a single agencies or if desired by different agencies (e.g., commuter rail, metropolitan transit, ferries, etc.) for possibly different fare structures (e.g., one way, weekly, point-to-point, unlimited ride, etc.).

The techniques illustratively described are adaptable to meet many different needs. As such, formatting techniques, user media, and supporting systems can be established that allow for standardized hardware and software platforms for media products such as fare cards that can be licensed by neutral or non-vendor parties and available to operators as well as contractors for the purpose of providing equipment and services for a particular industry that has implemented such user media services (e.g., smart card fare media in the transportation industry), while applying compatible solutions in order to allow for interoperability and open competition among providers. Such techniques may be specific to smart card applications such as ISO 14443 type A&B smart cards and dual interface smart cards, but are preferably media independent.

A flexible framework can be established that for example can address the current requirements of a particular industry (e.g., the transit industry), which allows a "pick and choose" type functionality for establishing user media (e.g., smart cards) for each service provider. For example, in the context of regional transportation services, this type of design provides a flexible framework that allows for configuration of regional fare media products in combination with "local" fare media products while maintaining data security, integrity, privacy and flexibility to allow for future expansion. The framework, for example, establishes data groups, data structures, and data elements that are grouped or associated based on the desired function of the data, combines mandatory and optional data elements for a data profile that corresponds to functional requirements of desired application features, is adaptable to memory size that is available for a corresponding application on user media such as a smart card specifically issued for one service, as well as on a third party card such as a credit or debit cards, and establishes an open architecture to allow integration of new features.

Other aspects may involve specifying a list of functional data groups, which have specific elements assigned to them, implementing a list of mandatory data elements that may be needed for interoperable use, establishing techniques for implementing an application on different media types with different memory size and organization, establishing options for dedicated user-media applications, and establishing the combination of different user-media applications (e.g., combining transit applications and credit card application on a card).

Figure 5:
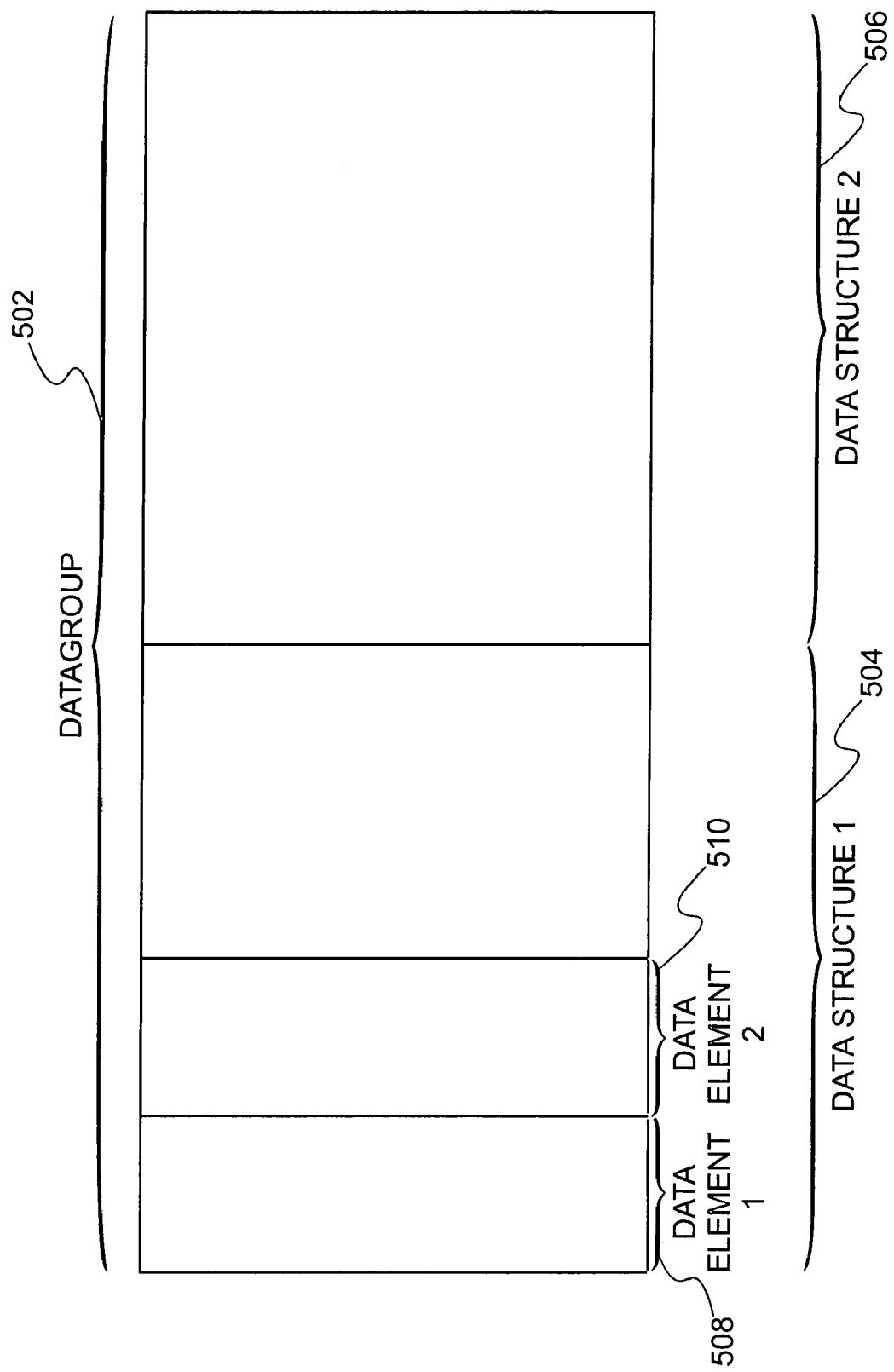
FIG. 5 is a functional block diagram of a data group in accordance with one embodiment of the present invention.

A modular approach is applied, in which "building blocks" are provided that can be used by each application issuer to configure the overall "structure" each issuer would like to implement on their user media (e.g., cards). Data types are selected for use on a user media to support required functionalities. Different data elements will, thus, be part of different functions, while desired functions are used to determine which one of potentially many different data elements will be on-board a card for storing data content or values for those data elements. The data organization of user media can for example be structured as illustratively shown in FIG. 5. User media may be structured into one or more data groups 502. Data group 502 may be structured to include one or more data structures 504 and 506, which can be further structured into one or more data elements 508 and 510. The hierarchy allows for the association of a function or application with data group 502 and the association of incremental levels of functional detail. Flexibility may be established by providing "super sets" of data fields or functions which are adaptable through subsets for desired functionality or application. For example, in a particular field of industry or services, a standard list of data groups, associated data structures, and associated data elements can be established that can be structured into subsets by originators of applications in that field of industry or services to meet their needs and to operatively implement for their individual applications in that field of industry or services. Data elements or structures that are not selected are entirely left out of an application except for example by including bit or flag indicating its absence (e.g., the bit size of an excluded data element will not contribute the amount of memory occupied by the application).

Figure 6:
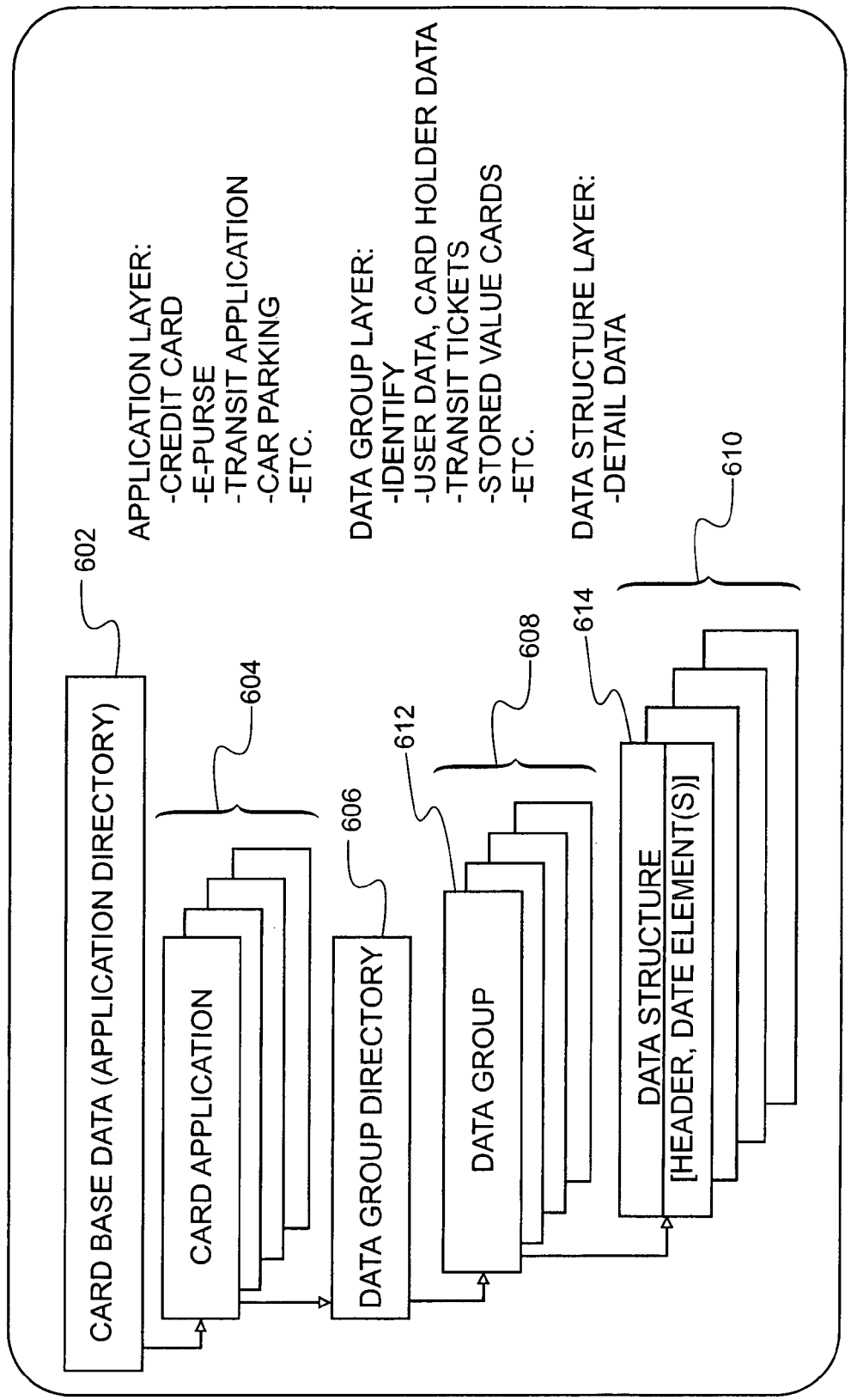
FIG. 6 is a functional block diagram of a card configuration in accordance with one embodiment of the present invention.

Such modular building blocks may be applied for example as illustratively shown in FIG. 6 to smart cards. Memory media on smart cards may be structured to include card base data 602, card application layer 604, data group directory 606, data group layer 608, and data structure layer 610. Data group layer 608 may include a plurality of data groups 612. Each data group 612 preferably corresponds to a function. (e.g., stored value, ticketing, and loyalty program by a specific entity, etc.). These data groups 612 are preferably subdivided into data structures 614 in data structure layer 610. Definitions of data groups 612 and data structure 614 may be logically driven by functional requirements and card limitations. For example, memory-type smart cards have a fixed layout, and record size, and, therefore, with an appropriate data structure definition, a proposed memory structure may fit onto all memory cards. Microprocessor-type smart cards, however, provide for different structures, and correspondingly, allow files to be configured in almost any arbitrary size.

Data structures 614 are preferably further subdivided into data elements. The data element can be considered the lowest structural "unit" of measure on a card. Based on these functional data groups, what is needed may be "built" onto a card in an efficient manner based on a specific originator's (e.g., transportation agency's) needs, while also allowing interoperability. A benefit of this design approach is that there is more flexibility for customization. Furthermore, on memory-type smart cards, variations in record size from one memory-type to another will not affect the card format. In addition, data elements can be varied without a tedious reorganization of element order and element definitions. Elements can also be added and subtracted with ease. A change in data group composition can be driven by the evolving needs of an application originator (e.g., a transit agency), which results in a high degree of likelihood that data group and data element definitions would have to be changed.

Data structures 614 and related formatting can be configured to offer a "map" (via a bitmap included at the beginning of a data structure) that indicates the data elements that are currently applicable and in use in that data group. The bitmap can preferably identify which data elements from a list of data elements were selected in configuring the current data structure (e.g., the current sequence of bits). The bitmap can also reflect the size of the data structure in that selected data elements, which may have defined bit lengths, contribute to the size of the data structure, while data elements that are not selected preferably do not contribute to the bit length of the data structure. Thus, new data elements can be specified and selectively added to the end of a data group or data structure, as needed. By using the bitmap, different systems can read slightly different configurations and implementations of the card format. The addition of new functions and data elements can be added without having to redesign the whole layout or adding new files.

In organization, card base data 602 may be an application directory that includes information identifying or pointing to the location of data associated with an application or an application category or type (e.g., an application category or type that holds one more applications in that category) in the application directory. Card base data 602 may include application identifiers or information from which a card application or category is identified. Card base data 602 may, if desired, identify locations on a card that values for different application identities for applications that have associated data on-board the card. For example, certain groups of bits may include information identifying a particular credit card company. Data group directory 606 may include information identifying different data groups 612 that are associated with that particular data group directory 606 and may contain related location or pointer information. Location and/or content information may also be associated with each data group in connection with associated data structures 614. Data group directory 606 may be associated with a corresponding application 604 or applications in the same application category or type.

Having a "flexible" structure partition has technical benefits as well as those of convenience. For example, currently, operations on common MIFARE type cards, which are known to those of ordinary skill in the art, are performed with data transfers of 16 byte blocks. This also corresponds to the record sizes on many other memory-type smart cards. Each operation performed can typically only deal with 16 bytes at a time. However, in the case where the rate of operation increases, for example, at a rate of 64 bytes per operation, a record size on a card of 16 bytes would require 4 operations to perform the same task that could be performed in 1 operation with the "flexible" structure partition. With the fixed 16 byte record size, four times the necessary transaction time would effectively be required.

In the future case where there is a card with 32 byte records, as opposed to 16 byte records, if a format with 16 byte records (or any other arbitrary fixed size) is to be "transferred" to a 32 byte record format, it would not be a trivial matter to map two 16 byte records onto one 32 byte record. The "quick and easy" solution would be to map one 16 byte record, onto one 32 byte record, which would result in an excess of 16 bytes of each record that is wasted. The techniques and systems of the present invention preclude the need for this. This approach assumes that an application may be used on different card types that may have different memory sizes and memory structures and accommodates for this possibility.

In the context of the transit industry, certain functions are typically used in implementing ticketing medium. A smart card may be configured to contain predefined data for a specific ticket type including time and distance parameters. This ticket can be used as single, round trip or multiple ride ticket or pass (e.g. weekly, monthly passes) based on its time and distance parameters. Validation may not be required when the smart card is used as a pass. A usage profile, based on check-in and check-out events, can be stored on the pass to recognize invalid usage. A validation or partial validation of the smart card is required prior to or during the journey in the case of single, roundtrip, or multiple-ride ticket types. Automated access to a "Paid Area" of a transit system will be given by check-in/check-out systems. Time and location can be used by an originator's implementation of a transit application to determine the tariff calculation for a current rider. Check-in and check out "stamps" may be generated and stored on the smart card.

Customers that are registered can receive benefits for their tariff calculation or payment methods. Otherwise, customers may use their fare medium without on-board data containing personally associated data for that customer. User specific information stored on the card can be utilized for the tariff calculation to determine an adequate ticket type either before the trip, (via ticket vending machine or ticket office machine) or automatically at check in/check out use. The smart card may also function as an ID-card for access control for transit agency staff. For example, image information may be stored on smart cards that can be accessed to identify the current cardholder.

Account-based smart cards may be implemented, where for example, payment can be made via a user-associated account, which may for example be only available to registered customers. In account-based smart card structures, a user can pay immediately or the user's account will be charged for predefined tickets before the trip. In check-in/check-out systems, the customer's account can be charged based upon usage transaction data (e.g., time or distance). A calculation can also be handled by the account provider, which may conduct processing to suggest or select the best fare under the circumstances.

If desired, a preloaded value can be stored either in a purse on the smart cards that can only be used by public transportation, or stored in a purse that could be used by additional card applications, (e.g. park and ride). The purse may be considered a "closed purse" with defined performances and processing protocols, as opposed to an "open purse" such as a public "electronic purse." The preloaded value can be used to purchase a predefined ticket type (e.g., before a trip), or as a pass that can be used through a system with check-in/check-out devices. This is based on the tariff system and uses deducted values from the purse. The value of the preloaded purse can be represented in any unit of currency. The purse can of course, be added to, when initial value is exhausted. The "value add" could be paid immediately (e.g., on the spot by the user) or by charging the user's account.

The ticketing card application may be loaded onto a smart card issued by a bank. For example, data structures, formatting, and content can be loaded onto the smart card of the bank that can be operatively used with a transit application. This smart card may already have an existing e-purse configured on-board. Values could for example be deducted directly from the e-purse based on purchases of predefined ticket types. E-purse values could also be altered by processing with check-in/check-out systems or by adding value to a stored value purse or ticketing application. Various applications (e.g., executable software, application data, or the combination) and payment processes can co-exist on a single card.

With the techniques and systems of the present invention that are illustratively described herein, an interoperable smart card can be provided for example in the context of the regional transit industry, that can be accepted by terminals of different transportation agencies that have different tariff systems. Different ticket types can be predefined on the system and stored on individual smart cards to be valid throughout the interoperational transit regions (e.g., a monthly ticket that is valid for the month for subways, ferries, and commuter rail). With such tickets types, services of different transit originators can be combined to benefit the user with packaging of services from multiple transit agencies, while in each case, the smart card may for example be structured to include a separate group directory and associated data structures for different applications of each agency that are operable with the cards. Stored check-in/check-out events can be recognized and processed for inter-agency transfers. For example, a check-in/check-out event from a commuter rail can be recognized by terminal equipment on-board bus transportation of a metropolitan transit provider to identify a free transfer. The systems may be configured to accept the discount condition of a personalized card throughout the transit region, even if there are different tariff schemes. For example, a user may have registered with one of a plurality of transit providers in a region to receive a discount on fares, which can be extended by the system to other transit providers in that region based on the user's region based on the user's registration. Another aspect, provides for a closed stored value purse for applications in that industry or field of services (e.g., providing different types of the same service) is accepted by the ticketing application of each provider for payment. Thus, a purse, that may have associated values stored in connection with multiple transit applications, may be closed for use to a group of applications (e.g., transit applications in region), such that a user can apply value from the purse to receive benefits of the same type or benefits from providers in the same field of services of industry (e.g., a user can decide on how he wants spend his transportation budget for the month). Another aspect may provide for additional ticket types stored on the smart card that are valid in a specific transit region or agency.

Further aspects, for example, may provide for additional ticket types stored on the smart card that are valid only to a specific transit agency or may provide for other agency-specific functions such as loyalty or other programs that are valid only to a specific transit agency. For transactions that are related to multiple agencies, a clearing procedure may be established. Required data, e.g. identity profiles, and user profiles, etc. are to be included in a card application in order to provide required transaction data for clearing procedures. For example, transactions with one agency may be related to data of an application of another agency on-board a card. In such cases, the transaction may be cleared with the other applications.

Figure 7:
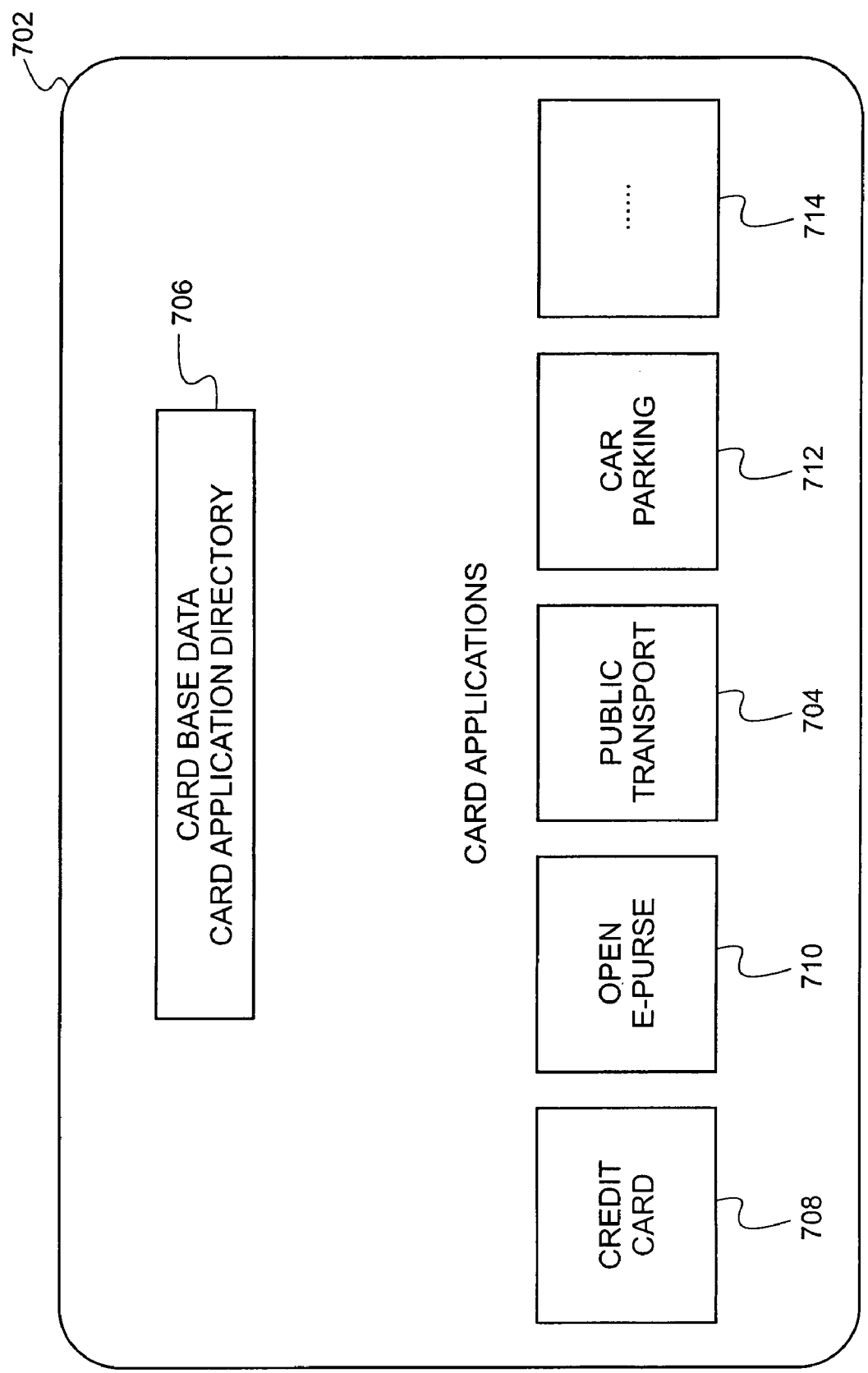
FIG. 7 is a functional block diagram of a multi-application card in accordance with one embodiment of the present invention.

FIG. 7 illustrates in functional diagram form, multi-application card 702 that provides one example of applications or categories of applications, e.g., public transport 704, being integrated onto a third party card. Public transport 704 may also be fully functional as a standalone application (or a standalone application category containing one or more applications) on a card. Multi-application card 702 may be a smart card or may be some other media. Other types of applications, other than transit, may also be configured for multi-application cards of a third party and if desired, further configured to be individually fully functional on card. Card base data 706 may identify and/or point to on-board card applications or categories of card applications, which may only contain data or contain data and executable code. Card applications on card 702 may include credit card 708, open e-purse 710, public transport 704, car parking 712, or other 714. a cardholder may use card 702 via card readers to receive the benefit of services associated with each category.

Figure 8:
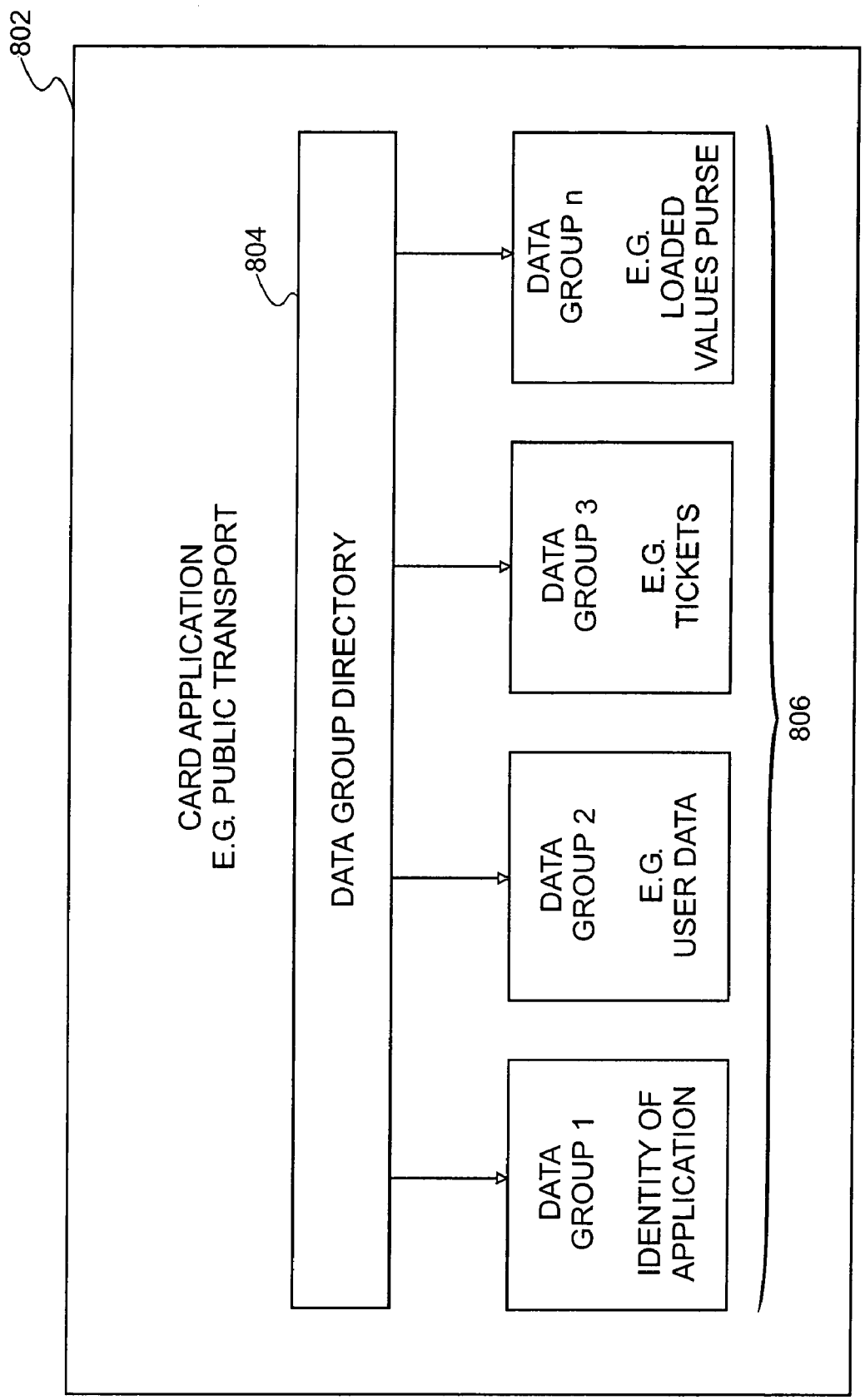
FIG. 8 is a functional block diagram of an application in a multi-application card in accordance with one embodiment of the present invention.

FIG. 8 illustrates the layout of different functional data groups in a card application, such as public transport application 704 of FIG. 7. Card application 802 may include data group directory that may include data group identifiers and/or location information such as data groups 806. Data group 806 may for example include a data group for the identity of the application, a data group for user data, a data group for tickets, a data group for a loaded value purse, and potentially other data groups. Thus, as shown in FIG. 8, data groups 806 and functions are referenced by directory 804.

Application 802 preferably contains a set of data structures, such as data groups 806 that define information directly related to a function stored on the card. Each application on a card may be structured on the same basis. A data group preferably contains data structures, that may for example be composed of header information, and data elements that contain the actual data details. All individual data of each card application are preferably structured together in separate functional data groups 806. Access to data groups 806 will be processed through data group references, specifically in this case, data group directory 804. Data group directory 804 may be structured as an open list and may include links to all different data groups 806 for that application 802 or applications in that category of applications. A data group identifier may be established in association with a corresponding data group (e.g., each data group is assigned a data group identifier). A data group may be absolutely referenced by its data group identifier. The identifiers may be used to absolutely describe a specific function in a card application. Depending on the physics of the card, a formal reference to an individual group may be assigned (e.g., data structure(sections, blocks, files)). Preferably, data structures and their data elements are grouped together in data groups 806 based on their functional structure. If desired, functionally identical data groups could be specified multiple times in an application. In addition, different data groups 806 could contain the same data structure and data elements. Thus, mutual exclusivity of data elements or data structure may not be required at the data structure layer. If access rights are desired, a defined access right may be assigned to all data elements of a data group. Table 1 and Table 2 below schematically illustrate a data group directory and data group.

TABLE 1

Data Group Directory

| Data Group Identifier | Reference (Format based on card physics) |
|---|---|
| 1 | Reference to data group 1 |
| 2 | Reference to data group 2 |
| . . . | Reference to data group n |

TABLE 2

| Data structure x | Data element 1 |
| | Data element 2 |
| | Data element . . . |
| Data structure y | Data element 1 |
| | Data element 2 |
| | Data element . . . |

Data groups 806 and the data structures assigned to them are preferably defined based on functional requirements. The physical specification of card types may define data storage restrictions with respect to data size as well as the memory structure of each individual card (sector, block, data structure). In addition, the physical card requirements will specify the physical location and the procedures by which access to the data on the media can be achieved. The physical card specifications and restrictions may be included in the definitions for a card application in order to optimize the system performance and the memory size requirements. An application in a distinct environment should preferably be implemented based on the physical card requirements/restrictions. In implementation, card operating systems, drivers, or card terminal software provides for appropriate translations in executing card applications, for example, by referencing the logical data structure to the physical implementation, which is dependent on the card type.

Data groups, as noted above, may be configured in a number of different ways. For example, each data group may be configured to comprise data structures. Each data structure may preferably include a header and a number of data elements. Data elements may be assigned to different data groups based on particular criteria. Assignments of data elements to specific data groups may be based on group function, read/write criteria assigned to the data group, which may often be required to be the same for all data elements inside the group), mandatory or optional category of a data group or other criteria.

A data group may be identified based upon a data group identifier (e.g., a unique data group identifier), which can be a special data element of each data group structure. The identifiers can specify a unique functionality inside a card application.

In implementation, there may be some data groups that are mandatory requirements of an application, and are designated as such. An "identification" data group, which can describe the application, is preferably one of these mandatory data groups. In order to handle multiple applications (e.g., multiple applications in the same category or type of applications) of the described structure by using the same access mechanisms, the data group identifiers of mandatory groups may be globally specified. This requirement may be established to be valid in all environments (e.g., in card terminals and PC-cards). In addition there may be certain unique mandatory data groups, which may only be specified once in an application. Functions added to an active application can be inserted as new data groups are added into the data group reference.

The data elements of a data group are preferably combined in data structures. The sequence of individual data elements, their function, and data format (type, data range, size) in a data structure can be specified by a structure definition. Such information may be established in a standard reference specification for data elements in a particular category of applications and/or established as part of the data structure (e.g. in a header to identify selected elements and values related to a selected element such as size, value, etc.). If a standard specification is established, values related to a data element can be automatically identified once it is recognized that the particular element is part of a current application. A structure-identifier (e.g., a unique structure identifier) may preferably be positioned at the beginning of each structure. The structure length which may follow directly after the structure identifier can specify the size of the complete structure. This can enable efficient bypass of data elements within a data structures as well as the addition of individual structures that are added for future features. It can also enable the application to directly jump to the next structure.

The existing data elements can be referenced in a data element directory structured in a bitmap. As such, it is possible to delete or add optional data elements by configuration of the bitmap based on the individual implementations. If data elements are added, they can be placed at the end of the data structure, and its addition may be reflected in the bitmap. The maximum number of data elements included in a data structure may be specified by and limited to the value of the structure length or the data structure directory.

TABLE 3

Table Illustrating Data Structure Detail

Data Structure

| Structure ID | Length | Bitmap | Data Element 1 | Data Element 2 | ... | Data Element n |
|---|---|---|---|---|---|---|

| Element | Bits | Value range | unit |
|---|---|---|---|
| StructureID | 6 | 1–64 | |
| Length of bitmap | 2 | 0–3 | 1 to 4 Byte |
| Length of structure | 8 | 3–255 | Byte (entire structure) |
| Bitmap | 8, 16, 24, 32 | | |
| Data Element 1 | 1–255 * 8 | | |
| Data_Element 2 | | | |
| ... | | | |

If structures are used exclusively in a specific data group, a unique structure ID is defined by the combination of a data group identifier and a structure identifier. In another aspect, multiple equal data structures could be assigned to the same data group. In order to use the same structure in different data groups, the structure itself should be defined accordingly. Based on this, a formatting structure may be applied in which part of the available range of structure identifier are assigned to describe data structures independent from the data group and another part of the available identifiers can be re-used with different data group identifiers.

Profiling may be applied to applications or application requirements to assign functions and associated data elements (e.g., from a template) to a particular application and to structure cards based on the assigned functions and data elements. Local functional requirements and card memory space required could vary in an interoperable environment. Based on this there may be different profiles that should be defined for a particular application (e.g., an application in a particular category) to accommodate the variations. All smart card terminals and related equipment, however, may be required to process the minimal functions of different card profiles in an interoperable environment. This can for example be supported by a smart card application carrying its own profile, which can be provided using data group identifiers, structure identifiers, structure lengths, and data element directories for the structures.

If desired, additional data groups may be added and/or new data structures may be added to data groups. New data groups and/or structures may be defined, or additional/new data groups may be defined out of existing structures (e.g., created from specified data elements or data structures). In one approach, new data elements may be added to the end of an existing data structure.

Figure 9:
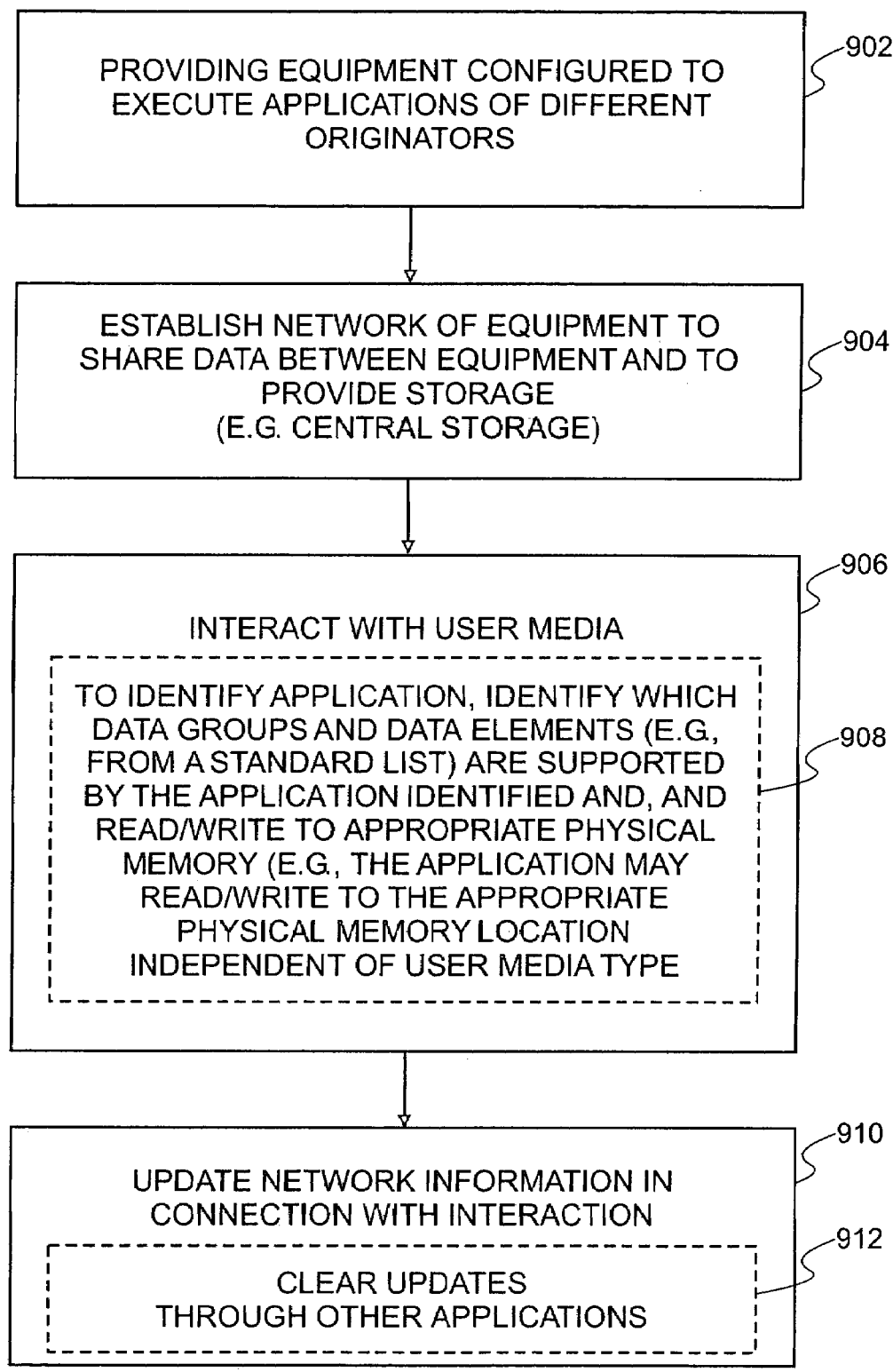
FIG. 9 is a flow chart of illustrative steps in providing implementing applications in a multi-application environment in accordance with one embodiment of the present invention.

Interoperability may be applied based on standardization in formatting techniques and application of such techniques within a network of card terminal equipment. For example, illustrative steps are shown in FIG. 9 for implementing multiple applications in a multi-application system environment. At step 902, equipment such as the equipment of FIG. 3 may be configured to execute applications of different originators (e.g., application developers, service vendor associated with an application, card issuer, organization providing the benefit of category of services, etc.). Applications may include individual public transportation applications, individual financial applications, or other applications.

At step 904, the equipment may be configured to be in a network to share data between equipment of different originators and to for example provide storage for user media information such as a central storage for updating related user information across the equipment of different originators. At step 906, networked equipment may interact with user media such as smart cards. Step 906 may for example include processes of step 908. At step 908, an application related to a current interaction with card reader equipment may be identified on-board user media. Data groups associated with the identified application may also be identified and/or located. The data groups may have been selected for use in the identified applications from a standard list of data groups and related definitions that the originator considered in implementing their application. The data groups may include data elements which may have been similarly selected. As part of the interaction, the equipment may read or write to appropriate physical memory (e.g., the identified application and/or supporting software may read or write the appropriate physical memory location independent of the current media type of user media).

At step 910, information on the network may be updated in connection with the interaction (e.g., a central storage or originator storage may be updated based on the interaction). Step 910 may include step 912 for clearing updates resulting from the interaction through other applications with which the user media is structured. Thus, interaction that may be related to data on other applications may be addressed through a clearing procedure by which memory on-board user media or external user-media may be appropriately updated.

Figure 10:
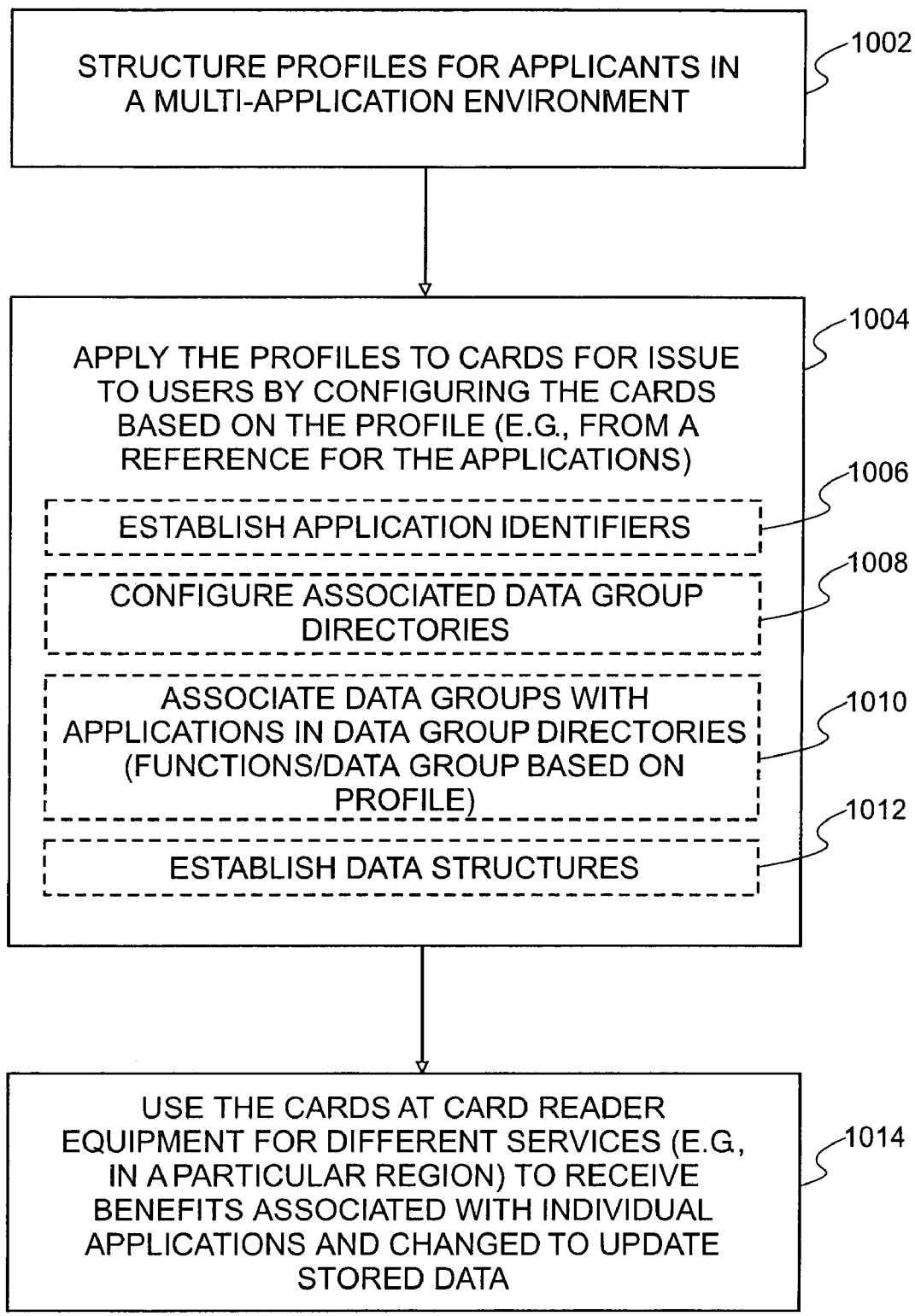
FIG. 10 is a flow chart of illustrative steps in configuring and using cards for different applications in accordance with one embodiment of the present invention.

A standard or reference for functions, sub-functions, and related data groups and data structures may establish flexibility in the implementation of applications while providing interoperability independent of issuer, originator, equipment vendor, equipment operator, or card type such that defined functions, sub-functions, data groups, and data structures can be applied to cross-reference or reuse between applications. Illustrative steps for providing techniques for multi-application interoperability are provided in FIG. 10. At step 1002, a profile may be established for an application to be used in the multi-application environment. A profile may be established for each application. A profile may be established by for example the originator of an application by identifying specifics from a standard or reference for functions, sub-functions, data groups, data structures, and other factors that can contribute to support the particular implementation of that type of application by the originator.

At step 1004, a profile may be applied to cards that are to be used by cardholders by configuring the cards based on the profile. Other user media may also be configured and used in illustrative steps of FIG. 10. Step 1004 may include steps 1006, 1008, 1010, and 1012. To apply the profile, an application identifier may be established for an application and configured on the cards for identification by card reader equipment. A data group directory may be configured in connection with an application or application identifier (or multiple applications/application identifiers in the an application category), which may include identification and/or location (e.g., pointer information) for data groups that were profiled for that application. The cards may be further structured to include data groups that are identified in the data group directory. Data groups may correspond to functions within an application which may been added to the profile on that basis. In addition, data structures, which may for example include a header and related data elements, may be configured for the cards. The data structures may have been selected to be part of the profile based on corresponding sub-functionality. There may also be mandatory data groups or data elements which may have to be established as part of this procedure. The data structures and the data groups may specifically identify which data structures and data groups were included as part of a profile by an application provider to be include on the system in connection with their application.

At step 1014, the configured cards may be used at card reader equipment in connection with different services (e.g., in a particular region) to receive the benefits associated with individual applications operating in the multi-application system and to store or update data associated with the data groups or data structures on-board the user cards and/or on the equipment of service providers.

For interoperable use of an application between different providers, it is necessary to have the option to customize the data groups specifically for it. Interoperability could require that specific options would be used in the specified main area only. The use of the same feature for other operators would be limited to the minimum required data groups. In order to include additional or new user specific data from individual users into the application, it may for example be necessary to store the individual user profiles in separate data groups.

There may be particular data elements that are structured on user cards that can support interoperability or may be required for establishing interoperability. An application identifier may provide direct access to an application via an application directory or a corresponding card command with the declaration of an application identifier. These application identifier declarations, which may be unique identifiers, may be related to the card type and/or the card issuer (a card standard, a card registration). As such, the same application could be assigned different card application identifiers. For the processing of logical card data and transaction data in supporting systems, a different application identifier may be implemented that may be a unique application identifier within the described application layout. This application identifier may specify the "functionality" of the application and as noted above is part of the data group application identity. This Application identifier is typically not related to the card type.

The version of the application describes the specific profile and the different kinds of functionalities of the application. The application version may be needed to support interoperability. Application versions should be unique relating to an application identifier only. This means the version should be independent between different application manufacturers. An application issuer region may be needed for interoperability in some types of applications (e.g., region public transportation applications). As long as application manufacturers cannot be clearly distinguished by means of the areas of use of the card structure, a region mark may lead to a demarcation, and specifies the region to which the application issuer belongs.

The application issuer may also represent data that may be needed for interoperability. An application may be profiled and administered by an application issuer. Simultaneous to the profiling the issuer may have the duty of overseeing key administration for the application. The application issuer may be the same as the card manufacturer, and it may be identical to the only acceptance provider as well. For application issuers, an identifier (e.g., a unique identifier) is allocated. This may for example be unique within the application that operates with this layout. Currency in the application may be also of importance for interoperability. All amounts, including the implemented stored value purse, may use the referenced currency (e.g., may only use that currency).

The application language may also be needed for interoperability. This is a basic language marker of the application within its area of use. A personalized card may have a user-referring language marker in the user identity that deviates from the language marker of the application. Another component for interoperability may be an application serial number. Every installation of an application on a card may have its own identity for which the utilization, outputs, and payments are at issue. The lack of ambiguity of this identity may be supported by a serial number. An application can be installed on a card before a personalization takes place. As a result, the user identity may not provide a contribution to the serial number. Also, in the case that a third party card manufacturer has the authorization to transfer an active ticketing application from an expired card to a new card, the unique identity of the card (card serial number) may not provide a contribution to this identity either. An application serial number, unique with an application issuer, may be provided. If the transfer of an application to a new card is not planned, the card serial number could be used as an application serial number. However, this always leads to a new identity and must be considered by the assignment to the supporting systems. Key and signature processing must take care that the transfer of an application to a different card as a simple "copy" does not lead to a valid application.

The physical card type may also be important for interoperability. For cards of the same physical card type, different configurations of the application can have consequences from the perspective of card readers and related equipment. Even if a card serial number is provided, it may not provide information about such variations. The installation time of the card application may also be important for interoperability. The installation time records the time that the card application was installed.

Data group application condition information may also be important for interoperability. The start of validity of an application may be structured to limit the date from which the application is valid (e.g., version 2.0 may be loaded and set to be made valid after a certain date). An end validity of application may also be implemented. An application may have a defined end validity date when issued. In that case, an update of this element must be made in the system as a special transaction if necessary. The status of the application may also be needed for interoperability. The actual condition of the whole application may for example be assigned the following values: 0—installed (not released), 1—active, 2—n locked (include reason for lock). Detailed information of the respective reason, source and time of a change of the condition may be shown in a data group having the function of history of common application events. Personalization may be a further category of data for interoperability, which may for example specify information on whether the current user is an anonymous or known user. A data group for the history of common application events may also be necessary for interoperability. These events may change the condition of the data group, "application condition." Application events are events that refer to the whole application. If for example, an application is locked, all application functions are unusable. Note, however, that locking a stored value purse within the application does not necessarily lead to the lock of a valid time card, which is not considered to be an application event.

Application event types may also be specified. Values for the event types describe a type of event or an operation. Values may for example indicate that an event or operation is installed, personalized, unlocked, or locked. Other related data that may be included for interoperability may be application even time, which provide a timestamp for when an event or transaction occurred, a transaction reference identifier, the operator terminal responsible for the event, the card terminal or device involved in the transaction/event, or other data that may support interoperability.

The techniques, including the methods and systems, illustratively described herein are sometimes primarily discussed in the context of cards, smart cards, or specifically memory smart cards. However, the techniques may also be applied to other forms or types of users media.

It will be understood by one of ordinary skill in the art that software keys may be implemented in connection with individual cards or applications. As such, card reader equipment will typically use corresponding key information to access applications or to access categories or types of applications (e.g., a key for transportation). In some instances, knowledge of a particular identification for a category or application may simply be used. Security may also be applied on lower hierarchy. For example, in MIFARE cards, access rights may be set differently from sector to sector so that data having the same access rights should be in the same sector(s). Keys may also be pre-assigned to individual application providers. For example, if there are two different transportation applications different keys or security setting may be established for the ability to access each. Thus, card reader equipment may apply required security processing for each transportation application to be able to access data in each. Security techniques such as those illustratively known to those of ordinary skill in the art such as security techniques implemented on smart cards may be implemented in connection with the techniques illustratively described herein.

For convenience and clarity, the diagrams in the figures are not illustrated to scale and are not illustrated to appropriate proportional relationship.

The techniques, including the methods and systems, illustratively described herein are sometimes primarily discussed in the context of a transportation application types, transportation services, or specifically a transportation application. However, the techniques may also be application to other forms or types of applications.

Thus, smart card systems and method can be implemented in which originators of related services may refer to a standard list of data elements that for example specifies length and formatting of data elements so that each originator may structure their applications (e.g., structure their data) differently and can identify which data elements were included for an application so that systems for that type of application can operate with the predetermined knowledge of a standard list to quickly identify, locate, and read data elements where the size of the data elements may vary from application to application of the same type. In addition, applications of different originators in the same field of service may be able to read and execute the data of other originators in the same field of service based on the standard list and the use of indexing techniques for data elements, which can reflect the current size and location of elements. Multiple applications may be configured within a card category (e.g., public transport, car parking, etc.) that can be configured to be operable within the systems of different originators of application in that category.

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified from the descriptions herein without departing from the methods and compositions disclosed and taught by the present invention.

What is claimed is:

1. A system for implementing smart cards, comprising:
a network of card readers and processing equipment that are configured to execute different card access operating applications implemented by different originators to benefit cardholders in response to interaction with smart cards;
a plurality of memory smart cards each carrying memory that contains a plurality of data elements selected for use in a card application from a standard list of data elements configured specifically for originators of one type of application to implement card applications of that type differently, wherein the memory further contains an index identifying which data elements from the standard list are included for use in that application
wherein the card access operating applications of the card readers of the different originators processing that type of application are configured to process data elements from the standard list in the same way, and are further configured to read the index, to map the index to the standard list to locate a particular data element of interest to a current card access operating application, to read a current value of that data element based on the mapping, and to perform an operation that uses the current value.

2. The system of claim 1 wherein the plurality of smart cards each contains a plurality of data groups associated with the card application that are selected from a standard list of data groups that are associated with the selected data elements and each data group contains a portion of the index identifying the data elements of that group.

3. The system of claim 1 wherein the data elements that are contained on the cards include plural data elements from the standard list that are specific to one of the originators for implementing different processes in its card application differently.

4. The system of claim 1 wherein the memory of the smart cards is configured to include a directory that includes a plurality of card applications and each card application is configured to include a directory that includes a plurality of data groups that are associated with each application.

5. The system of claim 1 wherein the memory of the smart cards is configured to identify which data elements from the standard list are the selected ones.

6. The system of claim 1 wherein the data of the smart cards includes at least two different card applications that have common data elements and different data elements that are selected from the standard list of data elements for implementing card applications whose application type is transportation.

7. The system of claim 1 wherein at least some of the smart cards additionally include a microprocessor and are configured to assign the card memory to the data groups on a file basis and the files are associated to card applications and the index of data elements and data elements are configured in records of the files.

8. The system of claim 1 wherein the network comprises a central computer that communicates with computer equipment of each originator to maintain a database of card information.

9. The system of claim 1 wherein memory space specified for each application on the smart cards is differently sized based on which of the data elements in the standard list have been selected for that application.

10. A system for providing multiple card-based applications, comprising:
a plurality of user cards each containing memory that is configured to include a plurality of application identifiers that are associated with a corresponding one of a plurality of applications, a plurality of data group directories that are each associated with a corresponding application identifier, a plurality of data groups associated with each group directory, with each data group having an associated data structure containing at least one data element, wherein the data structures identify which data elements a corresponding application provider selected to include on the system in connection with their application, wherein on different cards, a memory location of a current value of same data elements in same data structures associated with different originator applications is variable from application to application as a function of data elements implemented to be used in that application; and
computer equipment including card readers that are dispersed over a geographic region that interact with the user cards to support the applications by reading and writing to the user cards based on the configuration of the memory of the user cards,
wherein card access operation application of the card readers is configured to operate to read data structures, to identify which data elements have been implemented for a particular card application based on reading a data structure associated with that card application, to locate a position of a current value of a data element in the data structure based on the identified data elements, to read the current value of that data element based on the position located for that data element, and to use the current value of that data element in the computer equipment.

11. The system of claim 10 wherein the memory in the user cards and the computer equipment is configured to implement a regional transportation service comprising a plurality of different-originators.

12. The system of claim 10 wherein the user cards are smart cards.

13. The system of claim 10 wherein the data structures each include a header that identifies the data elements for which data representative of the value of that data element is stored.

14. The system of claim 10 wherein the memory of the user cards includes information identifying a location in memory for storing each particular data element.

15. The system of claim 10 wherein one of the applications is a transportation application.

16. A method for implementing smart cards, comprising:
configuring a network of card readers and processing equipment to execute different card access operating applications implemented by different originators to benefit cardholders in response to interaction with smart cards;
interacting with the network using a plurality of memory smart cards that each carries memory that contains a plurality of data elements selected for use in a card application from a standard list of data elements configured specifically for originators of one type of application to implement card applications of that type differently, wherein the memory further contains an index identifying which data elements from the standard list are included for use in that application wherein the card access operating applications of the card readers of the different originators processing that type of application are configured to process data elements from the standard list in the same way, and are further configured to read the index, to map the index to the standard list to locate a particular data element of interest to the card access operating application, to read a current value of that data element based on the mapping, and to perform an operation that uses the current value.

17. The method of claim 16 wherein the plurality of smart cards each contain a plurality of data groups associated with the card application that are selected from a standard list of data groups that are associated with the selected data elements and each data group contains a portion of the index identifying the data elements of that group.

18. The method of claim 16 wherein the data elements that are contained on the cards include plural data elements from the standard list that are specific to one of the originators for implementing different processes in its card application differently.

19. The method of claim 16 wherein the memory of the smart cards is configured to include a directory that includes a plurality of card applications and each card application is configured to include a directory that includes a plurality of data groups and that are associated with each application.

20. The method of claim 16 wherein the memory of the smart cards is configured to identify which data elements from the standard list are the selected ones.

21. The method of claim 16 wherein the data of the smart cards includes two card applications that have common data elements and different data elements that are selected from the standard list of data elements for implementing card applications whose application type is transportation.

22. The method of claim 16 wherein at least some of the smart cards additionally include a microprocessor and are configured to assign the card memory to the data groups on a file basis and the files are associated to card applications and the index of data elements and data elements are configured in records of the files.

23. The method of claim 16 wherein providing a central computer that communicates with computer equipment of each originator to maintain a database of card information.

24. The method of claim 16 wherein memory space specified for each application on the smart cards is differently sized based on which of the data elements in the standard list have been selected for that application.

25. A method for providing multiple card-based applications, comprising:

providing a plurality of user cards that each contain memory that is configured to include a plurality of application identifiers that are associated with a corresponding one of a plurality of applications, a plurality of data group directories that are each associated with a corresponding application identifier, a plurality of data groups associated with each group directory, with each data group having an associated data structure containing at least one data element, wherein the data structures identify which data elements a corresponding application provider selected to include on the system in connection with their application, wherein on different cards, a memory location of a current value of same data elements in same data structures associated with different originator applications is variable from application to application as a function of data elements implemented to be used in that application; and dispersing computer equipment including card readers over a geographic region that are configured to interact with the user cards to support the applications by reading and writing to the user cards based on the configuration of the memory of the user cards, wherein card access operating application of the card readers is configured to operate to read data structures, to identify which data elements have been implemented for a particular application based on reading a data structure associated with that card application, to locate a position of a data element in the data structure based on the identified data elements, to read the current value of that data element based on the position located for that data element, and to use the current value of that data element in the computer equipment.

26. The method of claim 25 further comprising configuring the memory in the user cards and the computer equipment to implement a regional transportation service comprising a plurality of different originators.

27. The method of claim 25 wherein the user cards are smart cards.

28. The method of claim 25 wherein the data structures each include a header that identifies the data elements for which data representative of the value of that data element is stored.

29. The method of claim 25 wherein the memory of the user cards includes information identifying a location in memory for storing each particular data element.

30. The method of claim 25 wherein one of the applications is a transportation application.

* * * * *